United States Patent [19]

Olsaker

[11] 4,142,765
[45] Mar. 6, 1979

[54] ROTOR BEARING ASSEMBLY FOR ROTARY GAS MACHINE

[75] Inventor: Oleif Olsaker, Michigan City, Ind.

[73] Assignee: Sullair Corporation, Michigan City, Ind.

[21] Appl. No.: 767,381

[22] Filed: Feb. 10, 1977

[51] Int. Cl.² ................... F16C 35/06; F04B 23/14
[52] U.S. Cl. ....................... 308/207 R; 418/203
[58] Field of Search ........... 308/207 A, 207 R, 208, 308/212, 213, 214, 219, 189 R, 232, 234; 418/201, 203; 415/170 A, 172 R, 172 A

[56] References Cited

U.S. PATENT DOCUMENTS

| | | | |
|---|---|---|---|
| 2,170,498 | 8/1939 | Hektner | 308/208 |
| 2,504,230 | 4/1950 | Smith | 418/203 |
| 2,935,247 | 5/1960 | Trulsson | 418/203 |
| 3,097,359 | 7/1963 | Cowles et al. | 418/203 |
| 3,317,258 | 5/1967 | Hermann | 308/207 |
| 3,323,844 | 6/1967 | Hedstrom | 308/207 R |
| 3,388,854 | 6/1968 | Olofsson et al. | 418/203 |
| 3,787,154 | 1/1974 | Edstrom | 418/201 |
| 3,947,078 | 3/1976 | Olsaker | 308/207 R |

Primary Examiner—Charles E. Frankfort
Attorney, Agent, or Firm—Wegner, Stellman, McCord, Wiles & Wood

[57] ABSTRACT

An adjustable bearing assembly for mounting a rotor in a rotary gas machine includes a tapered roller bearing at the high pressure end to bear the combined axial thrust and radial loads induced on the high pressure end by the working fluid therein and an axially floating bearing at the low pressure end to bear radial load. No axial bearing adjustment or bearing preload is applied to the radial load bearing at the low pressure end to maintain proper internal clearance in the bearing at the high pressure end. To obtain simplified assembly and improved bearing life, initial bearing clearance is provided simultaneously during adjustment of rotor end clearance.

4 Claims, 3 Drawing Figures

ROTOR BEARING ASSEMBLY FOR ROTARY GAS MACHINE

BACKGROUND OF THE INVENTION

This invention relates to a bearing assembly for a rotary screw gas machine with lubricant/coolant injection. A typical rotary screw machine has a housing with two axially extending intersecting bores, a low pressure connection at one end and a high pressure connection at the other end. Two rotors with complementary intersecting spiral screws are rotatably mounted within the bores and are carried by bearings mounted in the end walls of the housing. Typically, it is the bearings of a rotary screw machine which are the first component to fail in normal operation. Bearing size is limited by the center-to-center spacing of the rotors and cannot be increased to provide a heavier bearing. Accordingly, it is desirable that the thrust loads be distributed to a high capacity bearing at the high pressure end having appropriate bearing characteristics selected for maximum bearing life.

The most common rotary screw gas machine is the gas compressor, which is widely used for compressing air and refrigerants. Much of the following discussion will be concerned with the machine as a gas or air compressor. The novel bearing assembly may, however, be used with other rotary screw gas machines having a pressure differential between the inlet and outlet.

The radial bearing load at the low pressure end of the machine is relatively small as the fluid between the rotors is at a low pressure. In an air compressor, the pressure at the inlet is atmospheric. Conversely, at the high pressure end, the fluid trapped between the rotors is at high pressure and there is a substantial radial load on the high pressure end bearings. The high pressure fluid at the high pressure end is also trapped between the end faces of the rotors and the end wall of the housing. This establishes a substantial axial force on the rotors. It is desirable that the rotors be fixed axially in the housing so that the end faces of the rotors have a substantially fixed clearance from the end wall at the high pressure end of the housing. A variable clearance, as that necessary to accommodate thermal expansion of the rotors, is provided at the low pressure end of the housing. This relationship requires that the bearings at the high pressure end support a large thrust load in addition to a large radial load.

THE PRIOR ART

Early rotary screw machines utilized duplex ball bearings at the high pressure end. In such ball bearings, the balls have double angular contact with each race, fixing the rotors axially in the housing. These bearings are quite expensive.

More recently, it has been proposed in Olofsson U.S. Pat. No. 3,388,854 that each rotor be mounted with a combination of roller and ball bearings at each end. The main thrust load bearing is provided at the high pressure end. Springs between the bearings for each rotor at the low pressure end fix the rotors axially and prevent them from hitting the outlet end of the housing. A piston acting on the outer race of the ball bearing for one of the rotors at the low pressure end divided the thrust load between the bearings at each end. In my own U.S. Pat. No. 3,947,078, a bearing arrangement is disclosed which shares the thrust loads between single tapered roller bearings on each end of the machine.

SUMMARY OF THE INVENTION

It is a principal object of the invention to provide in a rotary gas machine, a bearing assembly which enables easy adjustment of the components thereof.

In accordance with the invention, a screw fluid machine has a high axial thrust and high radial load bearing between each rotor shaft and the housing at the high pressure end and a radial load bearing between each rotor shaft and the housing at the low pressure end. Such a bearing arrangement results in a floating rotor assembly movable in the direction of the thrust load caused by working fluid pressure difference with the bearing at the high pressure end using radial load to generate an axial force opposed to the thrust load.

More particularly, the high thrust and radial capacity bearing at the high pressure end is a tapered roller bearing. The radial bearing at the low pressure end is a cylindrical roller bearing with a separable inner or outer race.

A feature of the invention is that the axial force resulting from compression of the working fluid applies an axial force to an outer bearing cup of the high pressure end bearing through a cone thereby providing accurate radial locating of the rotors when the rotary machine is operated.

Another feature of the invention is the utilization of either lock nuts or a retainer with shims so that both rotor end clearance and internal bearing clearances may be adjusted simultaneously.

Because of the simplicity of construction associated with the utilization of a single tapered roller bearing at the discharge end, the cost is less than that of a double angular contact ball bearing or cylindrical roller bearing and an angular contact ball bearing.

Further features and advantages of the invention will readily be apparent from the following specification and from the drawings, which deal specifically with a rotary screw compressor; however, the principles described could equally well be applied to a rotary screw expander or fluid pump.

DESCRIPTION OF THE PREFERRED EMBODIMENT

Figure 1:
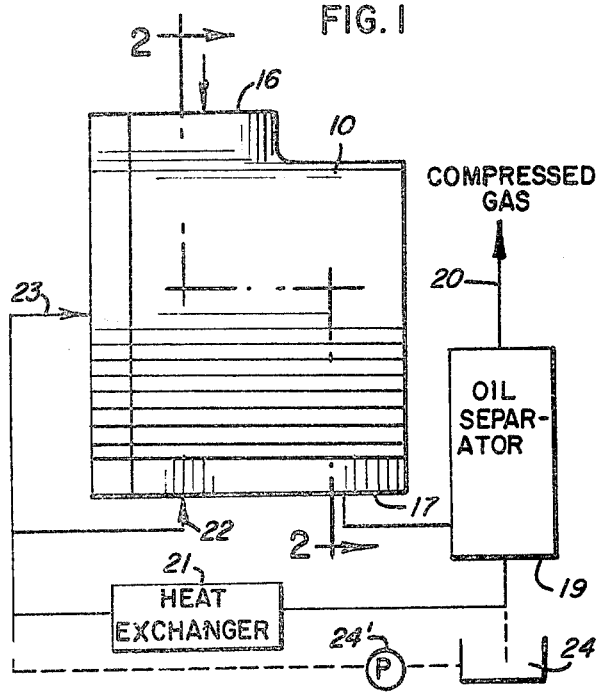
FIG. 1 is a diagrammatic view of a rotary screw compressor and cooling system.
Figure 2:
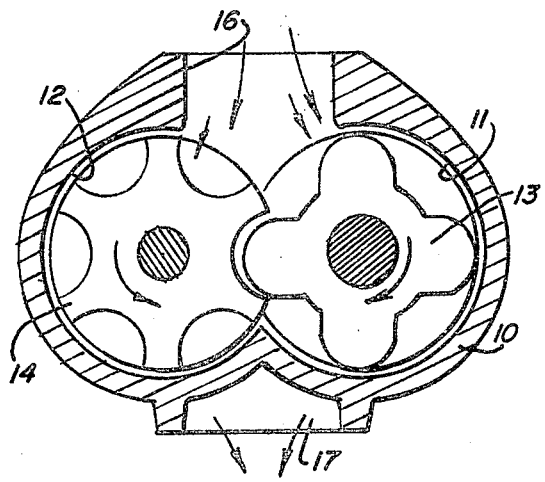
FIG. 2 is a transverse broken section taken generally along line 2—2 of FIG. 1.

A typical rotary screw compressor is illustrated diagrammatically in FIGS. 1 and 2. A housing 10 has axially extending intersecting bores 11 and 12 which receive a male rotor 13 and a female rotor 14, respectively. Spiral lobes and grooves on the rotors 13 and 14 mesh as the rotors turn. Gas is drawn in at inlet port 16, trapped within the housing, compressed as the lobes mesh and discharged at outlet port 17. In an expander, high pressure gas supplied to the port 17 drives the rotors and, following expansion, is discharged at the port 16.

The temperature of the compressor is controlled by the introduction of suitable coolant, such as mineral oil, which also serves to lubricate the rotors and to provide a seal between the rotors and between each rotor and the housing. Compressed gas from the outlet 17 is delivered to an oil separator 19. Essentially oil-free compressed gas is discharged through a line 20 and the oil is recycled, under pressure from the compressed gas, through a heat exchanger 21 to the compressor by a line 22 and to the inlet bearings by a line 23, as will be described in more detail below. Alternatively, the oil from the separator 19 may be drained to a sump 24 and recycled by a pump 24' at a controlled pressure independent of and, if desired, exceeding the pressure of the compressed gas.

Figure 3:
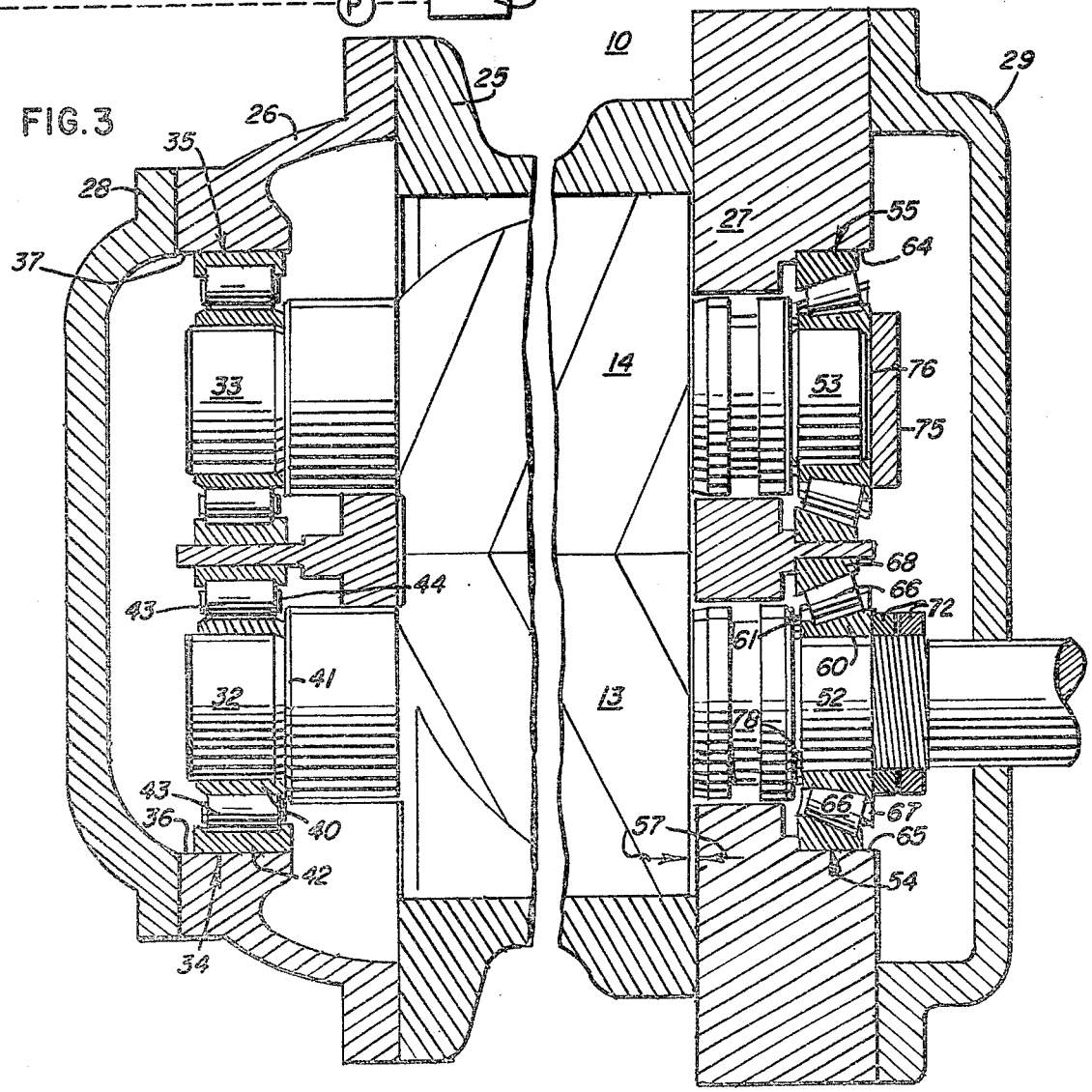
FIG. 3 is an enlarged longitudinal section through the compressor with the center portion omitted.

Referring to FIG. 3, the housing 10 comprises a generally cylindrical body 25 with inlet and outlet end plates 26 and 27 and inlet and outlet covers 28 and 29. The rotors 13 and 14 have shafts extending from each end, which are supported in bearings carried by the end plates 26 and 27.

At the inlet end, the rotors 13 and 14 have shafts 32 and 33 supported by cylindrical roller bearings 34 and 35 which, in turn, are received in bores 36 and 37 extending through the inlet end plate 26. The bearings 34 and 35 are axially floating, cylindrical roller bearings having a separable race and are particularly suited for carrying radial load. Since the bearings for the two shafts are similar, only bearing 34 of the male rotor 13 will be described in detail. The bearing 34 has an inner race 40 mounted on the shaft 32 which is seated against a shoulder 41 thereof and an outer race 42 received within the bore 36 of the inlet end plate 26. Cylindrical rollers 43 are held within a cage 44 between the inner race 40 and the outer race 42. Preferably, lubrication of the bearings 34 and 35 is achieved by the introduction of cooled oil through the inlet cover 28.

At the outlet end, the rotor shafts 52 and 53 are each supported by tapered roller bearings 54 and 55 which in turn, are received in bores 64 and 65 located in the outlet end plate 27. Compressed gas between the rotors 13 and 14 at the outlet end exerts a radial force on the rotors 13 and 14 tending to force the rotors apart. Accordingly, the bearings 54 and 55 have to withstand a greater radial load than the inlet bearings 34 and 35. The rotors 13 and 14 are urged toward the inlet end by a substantial axial load from the compressed gas which is present between the inner end surface of the outlet end plate 27 and the end face of the rotors 13 and 14 where a running clearance indicated by the arrows at 57 is provided.

The construction of the outlet end bearings is best seen in FIG. 3. Since the bearings for the two rotors 13 and 14 are similar, only the bearing 54 of the male rotor 13 will be described in detail. The bearing 54 has a cone race 60 seated against a load ring 78 which, in turn, is seated against a shoulder 61 on the shaft 52. A cup race 68 is held in the bore 65 against a shoulder (not numbered) by tapered rollers 66 which are held in operative position between the cone 60 and the cup 68 by a cage 67. The cone 60 is held against the load ring 78 by one or more threaded shaft lock nuts 72 or a retainer 75 with shims 76 (rotor 14) disposed axially outward from the cone 60 to bear inwardly against the outward end thereof. The retainer 75 may be secured to the end of the shaft 53 by bolts or the like (not shown). The load ring 78 provides a spring load to push the cone 60 against the lock nut 72. The axial positions of the cup 68 and the cone 60 establish the end clearance 57 between the inner face of the outlet end plate 27 and the end face of the rotors 13 and 14. The spacing may be selected by providing an appropriate shim 76 between the retainer and the rotor, or by adjusting the lock nuts thereby effectively changing the axial position of the cone on its respective shaft. Preferably, lubrication of the bearings 54 and 55 is achieved by directing cooled oil through the outlet end plate 27 onto the bearings.

The pressure difference generated by the working fluid at each end of the rotors 13 and 14 establishes a minimum axial force directed toward the low pressure end which centers the cup 68 in each of the bearings 54 and 55 relative to the cone 60, in the absence of other axial or counterbalancing forces.

The radial load on the rotors 13 and 14 at the outlet end is divided by the tapered bearings 54 and 55 into a radial component and an axial component. The axial component opposes the axial gas load thereby reducing the resultant rotor thrust loading on the outlet bearings 54 and 55. The angle of the cup 68 is selected so that the thrust resultant from the radial load is always kept lower than the pressure thrust load on the respective rotor to maintain proper centering of the rotors 13 and 14 and set the clearance between the rotors 13 and 14 and the outlet end plate 27.

The angle of the conical surface of the cup 68 with respect to the bearing axis is a factor in determining the thrust load which the bearing will handle. Increasing the bearing cup angle increases the ratio of thrust to radial rating for the bearing.

At stand-still when no gas forces are present, the tapered roller bearings 54 and 55 are carrying the weight of the rotors 13 and 14. The radial load from the weight will create a resultant thrust force in the bearings which will tend to pull the rotors 13 and 14 against the outlet end plate 27. This resultant thrust force is taken up and supported by the surface on the end face of the rotors 13 and 14 and the inner face of the outlet end plate 27. This means that the surface material in the rotors and the end plate must be selected in such a way that a material combination is provided that will have bearing characteristics. The surface finishes may be of the same character as used in hydrodynamic bearings.

I claim:

1. In a rotary screw gas machine having a housing with a low pressure port at one end and a high pressure port at the other end, main and gate rotors having shafts on which the rotors are mounted for rotation in the housing, the rotors meshing to move gas between the ports, the rotors being subject to a low radial load at the low pressure end, to a high radial load at the high pressure end and to an axial load urging the rotors toward the low pressure end when the rotary screw gas machine is operating, a mounting assembly for each rotor shaft comprising:

an axially-floating bearing with radial load capability between the rotor shaft and the housing at the low pressure end of the rotor shaft permitting the rotor shaft to move axially relative to the housing, said axially-floating bearing accommodating said axial movement of the rotor;

a single bearing with axial and radial load capability between the rotor shaft and the housing at the high pressure end of the rotor shaft including a cup race carried by the housing fixed against movement axially inward toward the low pressure end, a cone race movably carried by the rotor shaft axially outward from said cup race, and tapered rollers between said races; and means for axially positioning said cone race on the rotor shaft including a locking member adjustably fixed to the rotor shaft axially outward from said cone race having a surface engaged by the outward end of said cone race to hold said cone race against movement axially outward on the rotor shaft whereby operation of the gas machine moves the rotor toward the low pressure end of the housing with said locking member moving said cone race toward said cup race until the axial and radial load bearing is operatively engaged, whereby the axial and radial load bearing effects centering of the rotor shaft radially when the rotor is subjected to said axial load moving the rotor shaft toward the low pressure end, the axial and radial load bearing being loaded by the axial load placed on the rotor when the rotary screw gas machine is operated the rotor and rotor shaft being moved toward the high pressure end of the machine by a radial and axial load generated by the weight of the rotors when the rotary screw gas machine ceases operating, so as to unload the tapered roller bearings.

2. The bearing assembly of claim 1 wherein the rotary screw gas machine is a compressor and the axial load applied to said tapered roller bearings during operation is a function of the discharge pressure of the compressor.

3. The mounting assembly of claim 1 wherein said locking member is a lock nut threaded onto the rotor shaft axially outward of said cone race to define the extreme outward position thereof, said lock nut establishing the position of the rotor within the housing only during operation of the rotary screw gas machine.

4. The mounting assembly of claim 1 wherein said locking member is a retainer fixed to the end of the rotor shaft and extending radially outward therefrom to engage the outward end of said cone race to define the extreme outward position thereof, and further including means for positioning a shim between the rotor shaft and said retainer to change the axial position of said retainer relative to the rotor shaft, said retainer establishing the position of the rotor within the housing only during operation of the rotary screw machine.

* * * * *